United States Patent
Enomoto et al.

(10) Patent No.: US 7,769,233 B2
(45) Date of Patent: *Aug. 3, 2010

(54) PARTICULAR-REGION DETECTION METHOD AND APPARATUS

(75) Inventors: Jun Enomoto, Kanagawa (JP); Takafumi Matsushita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1093 days.

This patent is subject to a terminal disclaimer.

(21) Appl. No.: 11/083,988

(22) Filed: Mar. 21, 2005

(65) Prior Publication Data

US 2005/0207649 A1 Sep. 22, 2005

(30) Foreign Application Priority Data

Mar. 22, 2004 (JP) .............................. 2004-082318

(51) Int. Cl.
G06K 9/00 (2006.01)
G06K 9/46 (2006.01)
G06K 9/66 (2006.01)

(52) U.S. Cl. ...................... 382/190; 382/167; 382/118

(58) Field of Classification Search .................. 382/190, 382/167, 118

See application file for complete search history.

(56) References Cited

U.S. PATENT DOCUMENTS

| | | | | |
|---|---|---|---|---|
| 6,088,137 | A * | 7/2000 | Tomizawa | 358/538 |
| 6,445,819 | B1 | 9/2002 | Kinjo | |
| 7,317,817 | B2 * | 1/2008 | Okubo et al. | 382/118 |
| 7,324,246 | B2 | 1/2008 | Enomoto | |
| 2001/0000025 | A1 * | 3/2001 | Darrell et al. | 382/103 |
| 2003/0044070 | A1 * | 3/2003 | Fuersich et al. | 382/190 |
| 2003/0044177 | A1 * | 3/2003 | Oberhardt et al. | 396/158 |
| 2004/0233299 | A1 * | 11/2004 | Ioffe et al. | 348/239 |

(Continued)

FOREIGN PATENT DOCUMENTS

JP 2000105819 A * 4/2000

(Continued)

OTHER PUBLICATIONS

Ioffe, S.—"Red eye detection with machine learning"—IEEE 2003, pp. 871-874.*

(Continued)

*Primary Examiner*—Bhavesh M Mehta
*Assistant Examiner*—Bernard Krasnic
(74) *Attorney, Agent, or Firm*—Sughrue Mion, PLLC

(57) ABSTRACT

A particular-region such as red-eye region of a person in an image is detected at a high speed by a particular-region detection apparatus, as follows. At first, a region of the image satisfying detection conditions for particular region candidates is detected as a particular region candidate. Next, a face region of a first person is detected and the particular region candidate is specified as a particular region to be detected on condition that the particular region candidate is included in the detected face region. Then, face information regarding a face of the first person obtained when the face region is detected is stored. When a face region of a second person is further detected in the image or other image after storing of the face information, the face information is accessed and recalled and the face region of the second person is detected by using the face information as a face detection condition.

15 Claims, 4 Drawing Sheets

U.S. PATENT DOCUMENTS

2005/0238217 A1* 10/2005 Enomoto et al. ............ 382/128

FOREIGN PATENT DOCUMENTS

| JP | 2000-137788 A | 5/2000 |
|---|---|---|
| JP | 2000-148980 A | 5/2000 |
| JP | 2000-149018 A | 5/2000 |
| JP | 2003-209683 A | 7/2003 |
| JP | 2003-346158 A | 12/2003 |

OTHER PUBLICATIONS

Mikolajczyk, K.—"Face detection in a video sequence—a temporal approach"—IEEE 2001, pp. 96-101.*
Haro, A.—"Detecting and tracking eyes by using their physiological porperties, dynamics, and appearance"—IEEE 2000, pp. 163-168.*

* cited by examiner

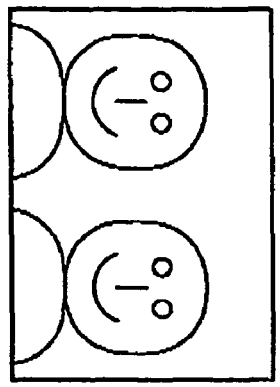
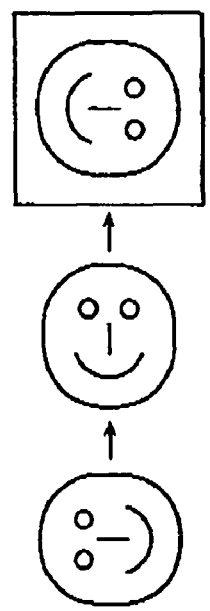
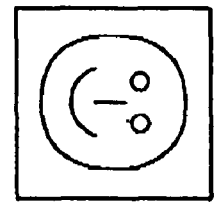
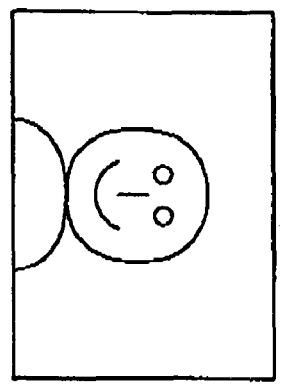
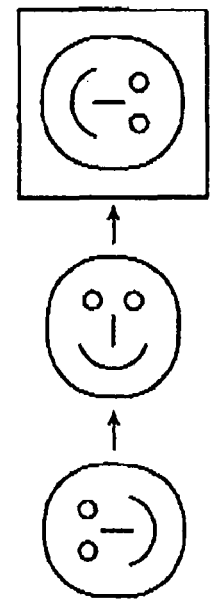
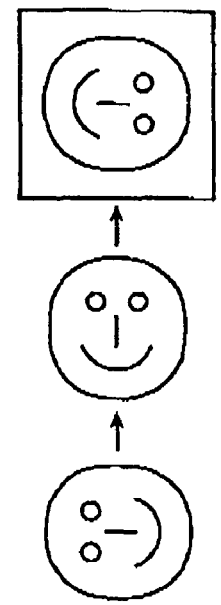
FIG. 3A  FIG. 3B  FIG. 3C

PARTICULAR-REGION DETECTION METHOD AND APPARATUS

CROSS-REFERENCE TO RELATED APPLICATION

This application claims priority from Japanese Patent Application No. 2004-82318, filed Mar. 22, 2004 in the Japanese Patent Office.

BACKGROUND OF THE INVENTION

The present invention belongs to a technology field of a particular-region detection process for detecting a particular region such as a red eye present in a face region through image processing from an image photographed on a photographic film or an image photographed by a digital camera. In particular, the present invention relates to a method and apparatus for detecting a particular region which enable high speed detection of a red eye or the like from an image, and a program for implementing the same.

There has recently been put to practical use a digital photoprinter for photoelectrically reading an image recorded on a film, converting the read image into a digital signal, subsequently executing various image processing operations to convert the digital signal into image data for recording, executing photosensitive material exposure by a recording light modulated in accordance with the image data, and outputting the image as a print.

In the digital photoprinter, the image photographed on the film is photoelectrically read, the image is converted into the digital image data, and the image processing and the photosensitive material exposure are executed. Accordingly, prints can be created from not only the image photographed on the film but also the image (image data) photographed by the digital camera or the like.

With recent popularization of a personal computer (PC), a digital camera, and an inexpensive color printer such as an ink-jet printer, many users capture images photographed by the digital cameras in their PC's, carry out image processing, and output the images by the printers.

Additionally, there has recently been put to practical use a printer for directly reading image data from a storage medium storing an image photographed by a digital camera, executing predetermined image processing, and outputting a print (hard copy). Examples of the storage medium include a magneto-optical recording medium (MO or the like), a compact semiconductor memory medium (Smart Media™, Compact Flash™ or the like), a magnetic recording medium (flexible disk or the like), or an optical disk (CD, CD-R, or the like).

Incidentally, in an image that contains a person of a portrait or the like as an object, a most important factor to determine the image quality is a finished appearance of the person. Thus, a red-eye phenomenon is a serious problem in that eyes (pupils) of the person become red because of an influence of stroboscopic emission during photographing.

In the conventional photoprinter that directly executes exposure from the film, red-eye correction is very difficult. However, in the case of the digital image processing of the digital photoprinter or the like, red eyes are detected by image processing (image analysis), and the red eyes can be corrected by correcting luminance or chroma of the red-eye regions.

As a method of detecting red eyes from an image when the red-eye correction process is carried out, for example, there is a method of detecting a face from an image by image data analysis, and then detecting eyes or circular round regions constituting red eyes from the detected face. There have also been proposed various face detection methods used for the red-eye detection.

For example, JP 2000-137788 A discloses a method of improving accuracy of face detection as described below. A candidate region assumed to correspond to a face of a person is detected from an image, this candidate region is divided into a predetermined number of small blocks, a feature amount regarding frequency or amplitude of a change in density or luminance is obtained for each small block, and the feature amount is collated with a pattern indicating feature amount for each of small blocks which are obtained by dividing the precreated region corresponding to the face of the person into the predetermined number. Accordingly, it is possible to improve the accuracy of the face detection by evaluating the degree of assurance that the face candidate region is a face region.

As another example, JP 2000-148980 A discloses a method of improving accuracy of face detection. At first, a candidate region assumed to correspond to a face of a person is detected from an image, next a region assumed to be a body is set by using the face candidate region as a reference when a density of the face candidate region is within a predetermined range, and then the degree of the assurance of a detection result of the face candidate region is evaluated based on presence of a region in which a density difference between the set body region and the face candidate region is equal to/less than a predetermined value, or based on contrast of density or chroma between the face candidate region and the body candidate region. Accordingly, it is possible to improve the accuracy of the face detection.

Furthermore, JP2000-149018 A discloses a method of detecting candidate regions assumed to correspond to faces of persons from an image by various detection analyses, obtaining a degree of overlapping of one among the detected candidate regions with the other candidate region in the image, and evaluating a region of a higher degree of overlapping to be higher in the assurance of a face region. Accordingly, it is possible to improve the accuracy of the face detection.

The face detection requires accuracy, and various analyses are necessary. Thus, ordinarily, the face detection must be performed in high-resolution image data (so-called fine scan data in the case of image data read from a film, or photographed image data in the case of the digital camera) used for outputting a print or the like, and that causes a lot of time for detection.

Besides, there can be basically four directions of a face in a photographed image depending on disposal orientation of a camera (horizontally oriented and vertically oriented positions and the like) during photographing. Here, if face directions are different, arraying directions of an eye, a nose, and the like naturally vary in vertical and left-and-right directions of the image. Thus, to reliably detect the face, face detection must be performed in all the four directions in the image.

There are various face sizes in the image depending on object distances or the like. If face sizes are different in the image, a positional relation (distance) between an eye, a nose, and the like naturally varies in the image. Thus, to reliably detect the face, face detection must be performed corresponding to various face sizes.

As a result, the red-eye correction process takes much time because the red-eye detection, especially the face detection, is subjected to rate-controlling. For example, in the case of the digital photoprinter, high-quality images of no red eyes can be stably output, but the long process time is a major cause for a drop in productivity.

SUMMARY OF THE INVENTION

The present invention has been made to solve the problems inherent in the conventional art, and an object of the present invention is to provide a method of detecting a particular region, capable of detecting particular regions likely to be present in a face region of an image such as red eyes or eye corners in the image at a high speed, stably outputting high-quality images with no red eyes for example, and greatly improving printer productivity; an apparatus for detecting a particular region which is used to implement the method; and a program for executing the method.

The present invention provides a particular-region detection method of detecting particular regions of persons from an image including a plurality of persons as objects. The method comprises: detecting a region of the image satisfying detection conditions for particular region candidates as a particular region candidate; detecting a face region of a first person and specifying the particular region candidate as a particular region to be detected on condition that the particular region candidate is included in the detected face region; storing face information regarding a face of the first person obtained when the face region is detected; and accessing the face information when a face region of a second person is further detected in the image after the storing of the face information, and detecting the face region of the second person by using the face information as a face detection condition.

The particular region may comprise a red-eye region.

The face information may contain information on a face direction in the image and the information on the face direction may be used as the face detection condition.

The face information may contain information on a face size in the image and the information on the face size may be used as the face detection condition.

The present invention also provides a particular-region detection method of detecting particular regions of persons from a plurality of images including the persons as objects. The method comprises: detecting a region of an image satisfying detection conditions for particular region candidates as a particular region candidate; detecting a face region of a first person and specifying the particular region candidate as a particular region to be detected on condition that the particular region candidate is included in the detected face region; storing face information regarding a face of the first person obtained when the face region is detected; and accessing the face information when a face region of a second person is further detected in other image after the storing of the face information, and detecting the face region of the second person by using the face information as a face detection condition.

The particular region may comprise a red-eye region.

The present invention also provides a particular-region detection apparatus for detecting a particular region of a person from an image including the person as an object. The apparatus comprises: detection means for detecting a region of the image satisfying detection conditions for particular region candidates as a particular region candidate; specifying means for detecting a face region of the person and specifying the particular region candidate as a particular region to be detected on condition that the particular region candidate is included in the detected face region, and memory means for storing face information regarding a face of a person which is obtained by previous detection and specification by the specifying means, wherein the specifying means detects the face region of the person by retrieving the face information stored in the memory means and by using the face information as a face detection condition.

The particular region may comprise a red-eye region.

The present invention also provides a program for causing a computer to execute processing of detecting particular regions of persons from an image including a plurality of persons as objects. The program comprises the procedures of: causing calculating means of the computer to detect a region of the image satisfying detection conditions for particular region candidates as a particular region candidate; causing the calculating means to detect a face region of a first person, and specify the particular region candidate as a particular region to be detected on condition that the particular region candidate is included in the detected face region; causing memory means of the computer to store face information regarding a face of the first person obtained when the face region is detected; and causing the calculating means to detect, when a face region of a second person is further detected in the image by the calculating means after the face information is stored, the face region of the second person by using the face information as a face detection condition.

The particular region may comprise a red-eye region.

The present invention also provides a program for causing a computer to execute processing of detecting particular regions of persons from a plurality of images including the persons as objects. The program comprises the procedures of; causing calculating means of the computer to detect a region of an image satisfying detection conditions for particular region candidates as a particular region candidate; causing the calculating means to detect a face region of a first person, and specify the particular region candidate as a particular region to be detected on condition that the particular region candidate is included in the detected face region; causing memory means of the computer to store face information regarding a face of the first person obtained when the face region is detected; and causing the calculating means to detect, when a face region of a second person is further detected in other image by the calculating means after the face information is stored, the face region by using the face information as a face detection condition.

The particular region may comprise a red-eye region.

With the configuration of the present invention, when a particular region likely to be present in the face region of an image such as a red eye or an eye corner in the image is detected for correction or the like, face detection in a region in which the particular region is not present is made unnecessary, and face detection corresponding to all face directions, vertical and horizontal, on an image surface (all of the vertical and horizontal directions on a screen in any of which a head top can be directed) or face detection corresponding to all assumed face sizes is made unnecessary. Accordingly, it is possible to detect a particular region such as a red eye at a high speed.

Thus, according to the present invention, for example, high speed red-eye detection enables quick red-eye correction. For example, in the photoprinter that creates a photographic print from image data obtained by photoelectrically reading a photographic film, image data photographed by a digital camera, or the like, by limiting a drop in productivity to a minimum, it is possible to stably output a high image quality print with no red eyes.

BRIEF DESCRIPTION OF THE DRAWINGS

In the accompanying drawings:

FIGS. 3A to 3C are conceptual diagrams illustrating red-eye detection according to a conventional art and the present invention.

DETAILED DESCRIPTION OF THE PREFERRED EMBODIMENT

Hereinafter, the preferred embodiments of a method and an apparatus for detecting a particular region, and a program therefor of the present invention will be described in detail with reference to the accompanying drawings.

In the description below, detection of a red eye as a particular region likely to be present in a face region of an image will be taken as an example. However, the present invention is not limited to this example.

Figure 1A:
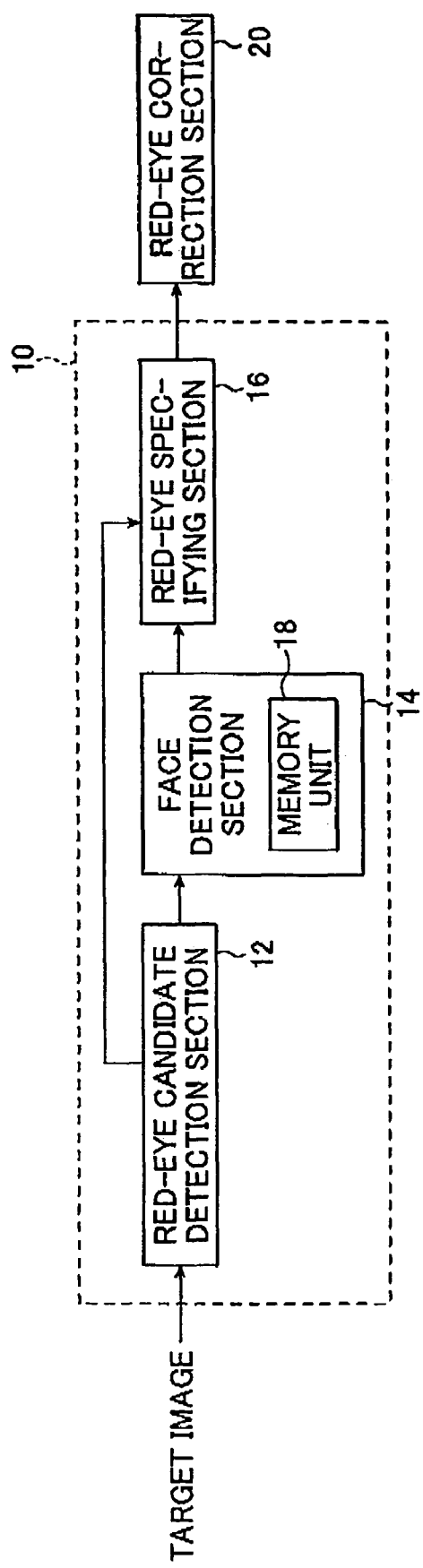
FIG. 1A is a block diagram conceptually showing an example of a red-eye detection apparatus according to the present invention.

FIG. 1A is a conceptual block diagram of an example in which the particular-region detection apparatus of the present invention implementing its particular-region detection method is used for a red-eye detection apparatus. The program of the present invention is a program for executing a detection process described below.

A red-eye detection apparatus 10 (referred to as a detection apparatus 10, hereinafter) shown in FIG. 1A detects a red eye from an input image (its image data) for red-eye detection, and outputs the red eye to red-eye correction section 20, and is configured by including red-eye candidate detection section 12, face detection section 14, and red-eye specifying section 16. The image detection apparatus 10 is configured by using a computer such as a personal computer or a work station, a digital signal processor (DSP) or the like as an example.

It is to be noted that the detection apparatus 10 and the red-eye correction section 20 may be constructed integrally, or the detection apparatus 10 (alone or in combination with the red-eye correction section 20) may be incorporated in an image processor (means) for performing various image processing operations such as color/density correction, gradation correction, electronic scaling, and sharpness processing.

In the detection apparatus 10 of the present invention, there is no particular limitation on a processing target image (target image hereinafter) for red-eye detection as long as it is a color image. For example, an image photographed on a photographic film by a camera (image data being obtained by photoelectrically reading a photographed image from a photographic film), or an image (image data) photographed by a digital camera may be used. Needless to say, the target image may be an image (image data) subjected to various image processing operations as occasion demands rather than a photographed image itself.

First, the target image is fed to the red-eye candidate detection section 12.

The red-eye candidate detection section 12 detects a region likely to be a red eye, i.e., a red-eye candidate, from the target image, and feeds positional information of the red-eye candidate (coordinate information of its center), region information, information of the number of candidates, and the like as red-eye candidate information to the face detection section 14 and the red-eye specifying section 16.

Figure 1B:
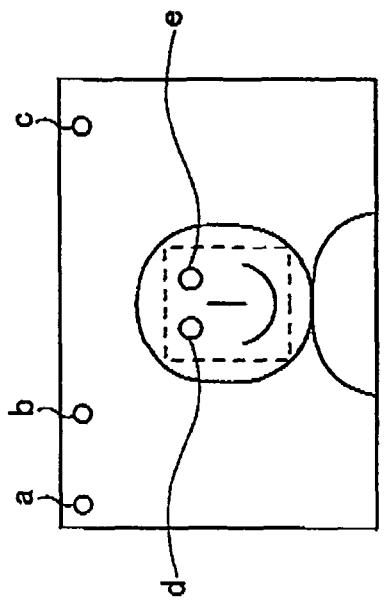
FIG. 1B is a conceptual diagram illustrating red-eye detection according to the present invention.

For example, as shown in FIG. 1B, a person is photographed in a scene having three red lamps on the background. In the case of an image (scene) in which a red-eye phenomenon occurs in the person, "a" to "c" corresponding to the red lamps, and regions indicated by "d" and "e" corresponding to red eyes are detected as red-eye candidates, and fed to the face detection section 14 and the red-eye specifying section 16.

There is no particular limitation on methods of detecting red-eye candidates. Various well-known methods may be used.

An example thereof is a method of extracting a region of a red hue in which pixels congregate by a predetermined number or more, and detecting a region likely to be a red eye as a red-eye candidate by using the degree of red eye (to what degree the relevant region is likely to a red eye in color) and the circularity (how much the shape is round) both preset from many red-eye image samples.

A detection result of the red-eye candidate is sent to the face detection section 14. The face detection section 14 executes face detection in an area including the red-eye candidate detected by the red-eye candidate detection section 12 based on the red-eye detection result (e.g., the positional information), and feeds information of the red-eye candidate included in the region in which a face is detected, or even a face detection result to the red-eye specifying section 16.

For example, in the example shown in FIG. 1B, face detection operations are sequentially performed in predetermined regions including the red-eye candidates "a" to "e", respectively, corresponding to the individual red-eye candidates. An example thereof is that face detection is first carried out in a predetermined region including the red-eye candidate "a" corresponding to the red-eye candidate "a", similar face detection is then carried out corresponding to the red-eye candidate "b", similar face detection is carried out corresponding to the red-eye candidate "c", similar face detection is then carried out corresponding to the red-eye candidate "d", and lastly similar face detection is carried out corresponding to the red-eye candidate "e".

Thus, in this case, when the face detection operations are carried out corresponding to the red-eye candidates "d" and "e", for example, a region surrounded with a dotted line is detected as a face region. Accordingly, the face detection section 14 feeds information that the red-eye candidates "d" and "e" are the red-eye candidates included in the face region, or even information of the detected face region to the red-eye specifying section 16.

As described above, the face detection is a process which takes much time. In the conventional red-eye detection, red-eye detection is executed in a detected face region after face detection is carried out. Thus, face detection is carried out even in a region having no red eyes, resulting in very long face detection.

On the other hand, according to the present invention, as described above, face detection is carried out only in a predetermined region including a red-eye candidate after the red-eye candidate is detected. Thus, useless face detection in a region having no red eyes is eliminated, making it possible to greatly shorten the time of face detection in red-eye detection.

There is no particular limitation on face detection methods of the face detection section 14. Various well-known methods may be used such as a method of detecting a face region from a target image by using an average face image precreated from many face image samples, i.e., a template of a face (face template hereinafter), and methods described as other face candidate detection methods in JP 2000-137788 A, JP 2000-148980 A, and JP 2000-149018 A.

Here, in the detection apparatus 10, the face detection section 14 includes a memory unit 18. When face detection is successful corresponding to a red-eye candidate, information of the face is stored in the memory unit 18. When face detection corresponding to the red-eye candidate for next face detection (face detection based on the region of the next red-eye candidate) is carried out, the face detection is tried by using the information of the face just previously detected (i.e., last detected face in the detection apparatus 10) that has been stored in the memory unit 18.

According to the present invention, the face detection corresponding to the next red-eye candidate means, when there are a plurality of red-eye candidates in one image, the face detection corresponding to one red-eye candidate carried out subsequently to the face detection corresponding to another red eye candidate. Alternatively, with respect to one case (one order), it means the face detection carried out first in a frame (image) after information of the face of a person detected in the face detection corresponding to a red-eye candidate in the previous frame is stored. One case ordinarily represents a plurality of images recorded on one film or one storage medium. When processing is repeated on one case, upon face detection corresponding to a red-eye candidate first tried in a frame, the information of the face last detected in the previous frame is used. It is also possible to use the information of the face lastly detected in a certain case for the first face detection in the next case.

Specifically, in the face detection corresponding to a red-eye candidate, when face detection of a person is successful, information of a direction of the detected face (direction of a head top on a photographic screen (=image surface)) and information of a size of the face are stored as pieces of the face information of the face in the memory unit 18. In face detection corresponding to a next red-eye candidate, the face information is read from the memory unit 18, and the face detection is first tried by using the direction and the size of the face.

Accordingly, it is possible to shorten the face detection time in addition to shortening of the process time by first executing the red-eye candidate detection.

As described above, there are basically four directions of the face in the photographed image in accordance with the disposal orientation of the camera during the photographing, that is to say, depending on whether the camera is horizontally or vertically oriented and what position its top (or bottom) is in during the photographing, as shown in FIGS. 2A to 2D.

Figures 2A, 2B, 2C, 2D:
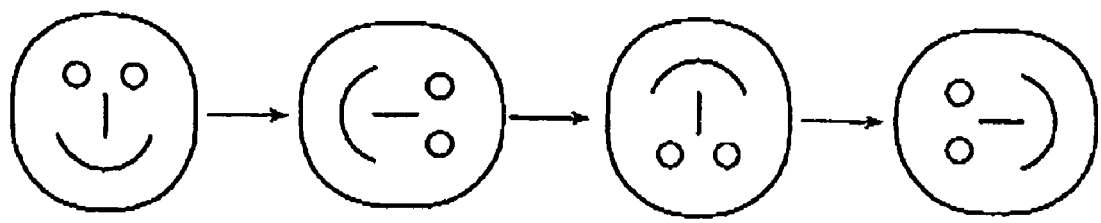
FIGS. 2A to 2E are conceptual diagrams illustrating a face detection method.

For convenience, a face direction of FIG. 2A is considered to be of an angle 0°, a face direction of FIG. 2B to be of an angle 90°, a face direction of FIG. 2C to be of an angle 180°, and a face direction of FIG. 2D to be of an angle 270° (referred to as angles 0°, 90°, 180°, and 270° by omitting "face directions", hereinafter). The angles 0° and 180° correspond to the photographing with a camera in a so-called horizontally oriented position (images extending horizontally with their top and bottom vertically located). The angles 90° and 270° correspond to the photographing with a camera in a so-called vertically oriented position (images extending vertically).

As described above, when face directions vary, arraying directions of eyes, noses, mouths, and the like on the screen are different. Thus, to properly detect all the faces, face detection must be tried by sequentially changing the face directions.

Accordingly, in ordinary face detection, for example, a face template 0° of FIG. 2A is created/stored. The face template is rotated (or a target image is rotated), and face detection operations are sequentially tried in predetermined order of face directions (e.g., order of 0°→90°→180°→270°) in target regions (corresponding to face size) of the face detection until faces are detected. In other words, in this case, the face detection is tried in a maximum of four face directions (a case in which a face direction is 270°, and a case in which a detection target region is not a face).

There are various face sizes in the image depending on object distances or the like. When face sizes vary, distances between eyes, noses, mouths and the like are naturally different. Accordingly, to properly detect all the faces, the face detection must be tried by sequentially changing various face sizes.

Figure 2E:
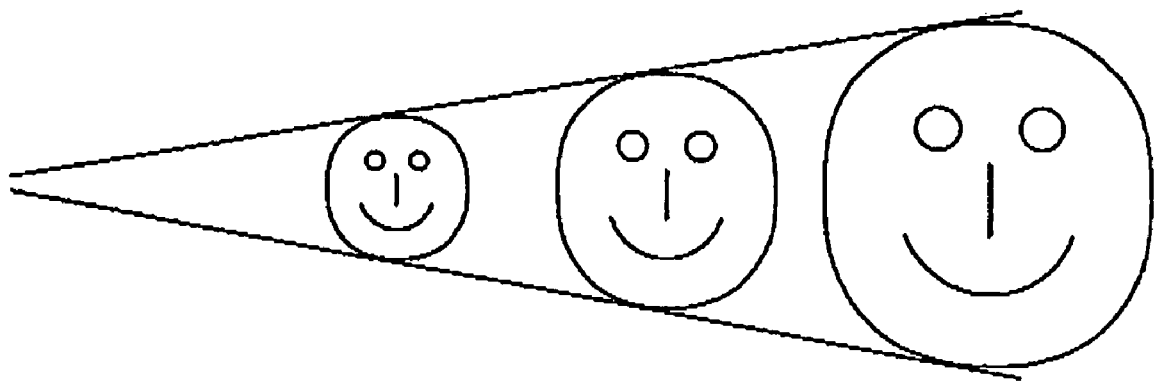

Thus, in ordinary face detection, for example, as schematically shown in FIG. 2E, a face template created/stored beforehand by resolution conversion is expanded/reduced (or target image in red-eye detection is expanded/reduced), and face detection operations are sequentially tried in predetermined order of face sizes (e.g., order of standard size→large size→small size) in detection regions until faces are detected. In other words, in this case, the face detection is tried corresponding to a maximum of three sizes (as above).

Thus, the face detection is tried corresponding to all combinations of the face directions and sizes set at the maximum. In the illustrated example, the face detection is tried by a maximum of twelve times.

Here, when a plurality of persons are photographed in one image, ordinarily, the face direction is the same. In the case of ordinary photographing, photographing with the camera positioned upside down is quite rare. Thus, face directions in the images of one case photographed with a camera in a horizontally oriented position are normally the same. One case is mostly photographed by one photographer, and if the photographer is the same, face directions in the images photographed with a camera in a vertically oriented position are normally the same.

Furthermore, when a plurality of persons are photographed in one image, face sizes of the persons are often similar. In one case, even different frames (images) may often hold a similar scene sequentially. In other words, it is highly likely that images of roughly equal face sizes are located in series over a plurality of frames.

That is, the face directions and sizes of the persons (face information of the persons) in one image are often similar, and there is a high possibility that frames of similar face directions and sizes of the persons are located in series in one case. According to the present invention, it is possible to efficiently detect the faces of the persons by using such pieces of face information as face detection conditions.

Thus, the face direction and size previously (last) detected are stored as pieces of face information in the memory unit 18. When face detection corresponding to a next red-eye candidate is tried, the face detection is first tried base on the stored face direction and size. Thus, there is a high possibility that faces of the persons may be detected in the first face detection. In other words, it is possible to greatly shorten the time of face detection corresponding to red-eye candidates.

Description will now be made referring to conceptual diagrams of FIGS. 3A to 3C.

For example, when frames of a face direction of 180° are located in series as schematically shown in FIG. 3A, in the conventional face detection method, as shown in FIG. 3B, face detection is first tried at 0° in a certain frame. When the face detection fails, face detection is then tried at 90°. When the face detection similarly fails, face detection is subsequently tried at 180°, thereby succeeding in the face detection. In a next frame, similarly, face detection operations are sequentially tried at 0°, 90°, and 180°, and the face detection succeeds at 180°.

On the other hand, according to the present invention, as shown in FIG. 3C, face detection operations are sequentially tried at 0°, 90°, and 180° in a certain frame, and a face is detected at 180°. Here, in the present invention, a face direction of 180° is stored as face information in the memory unit 18. In a next frame, face detection is first tried at 180° by using the face information that the direction of the face detected in the previous frame is 180°. Thus, the face detection can succeed in the first trial. In other words, it is possible to greatly shorten the time of face detection.

According to the present invention, when a red-eye candidate is not a red eye, as in the case of the conventional face detection, face detection must be tried corresponding to four face directions.

Here, as described above, it is quite rare in an ordinary photographing to photograph with a camera positioned upside down. Thus, according to the present invention, when a direction of a last face successfully detected is 0° (or 180°) in photographing with a camera in a horizontally oriented position in one case, the face detection at 180° (or 0°) may be omitted. Accordingly, face detection needs to be tried only in three face directions, making it possible to shorten the time of stable face detection.

According to the present invention, face information to be stored is not limited to pieces of face direction information and face size information. Only one of the pieces of information may be stored, or other face information regarding face detection may be used. However, because of a high possibility that face directions may be the same in one image or one case, at least the face direction information should preferably be stored.

Face detection is ordinarily tried at each 90° corresponding to four directions. However, the present invention is not limited to this, and the face detection may be tried under a finer angle division. Further, face sizes are not limited to standard, small, and large sizes, and the face detection may be tried corresponding to finer size setting. As the face detection is executed in a more meticulous and finer way, detection accuracy is increased, but the process time becomes longer. Thus, proper determination may be made according to required productivity, accuracy, or the like.

In the example, the face direction and the face size are previously stored, and the face detection is first tried corresponding to the stored face direction and size. However, this example is in no way limitative of the present invention.

For example, the face detection corresponding to the face information obtained when the face has been detected may not be tried firstly. In the face detection trial, the face detection corresponding to the face information obtained when the last face has been detected may preferentially be tried. Alternatively, a weight of the face information obtained when the last face has been detected may be increased to try the face detection.

According to the present invention, basically, it may be only information of a previously (last) detected face that is stored. However, the present invention is not limited to this. Further previous face information may be stored to be used for face detection.

For example, as described above, photographing with the camera positioned upside down is quite rare. Thus, if face detection succeeds at, e.g., 0°, in a previous frame in one case, this information is held, and detection at 180° may be omitted in subsequent frames.

In the case of a plurality of images in one case, it is probably judged that photographing has been carried out with the same camera and by the same person. Accordingly, it is generally the case that face directions in the images during the photographing with a camera in a horizontally oriented position are all constant at, e.g., 0°, and face directions in the images during the photographing with a camera in a vertically oriented position are all constant at, e.g., 90°. Thus, when a red-eye candidate is a red eye, if face detection fails based on direction information of a last face for the red-eye candidate, face detection is next tried based on the direction of a face detected before the last face that is different from the direction of the last face, resulting in a high possibility of successful face detection. Thus, it is possible to achieve a high speed of face detection. Alternatively, in one case, for a first image, face detection may be tried for the red-eye candidate by changing the face direction and size of the face template as described above. For subsequent images, face detection may be tried based on the face direction and size obtained for the first image.

As described above, in the present invention, for the face detection, the face template may be rotated/expanded (or reduced). Alternatively, the rotated/expanded (or reduced) face template may be prepared. Otherwise, the target image may be rotated/expanded (or reduced). However, in view of a long process time and complexity, processing of both of the face template and the target image is not advantageous. Accordingly, according to the present invention, the target image should preferably be rotated/expanded (or reduced) while the face template is fixed, or the face template should preferably be rotated/expanded (or reduced) (or created beforehand) while the target image is fixed.

Generally, a data volume of the face template is smaller, and an arithmetic operation amount and a time for image processing are accordingly smaller. For this reason, it is more advantageous to try face detection while fixing the target image.

As described above, the detection result of the red-eye candidates by the red-eye candidate detection section 12, and the red-eye candidates included in the regions of the faces detected by the face detection section 14 are fed to the red-eye specifying section 16.

By using such information, the red-eye specifying section 16 specifies the red-eye candidates around which the faces are detected as red eyes, and feeds positional information of the red eyes, information of a red-eye region, information of the number of red eyes, or the like to the red-eye correction section 20 as red-eye detection result in the target image.

In accordance with the red-eye detection result fed from the red-eye specifying section 16, the red-eye correction section 20 executes image processing of the red-eye region of the target image to correct the red eyes of the target image.

There is no particular limitation on red-eye correction methods, and various well-known methods may be used. Examples include a correction process of correcting a red eye by controlling chroma, brightness, hue, or the like of a red-eye region in accordance with an image feature amount or the like of the red eye or a red-eye surrounding area (it may include a face surrounding area), and a correction process of simply converting a color of the red-eye region into black.

Figure 4:
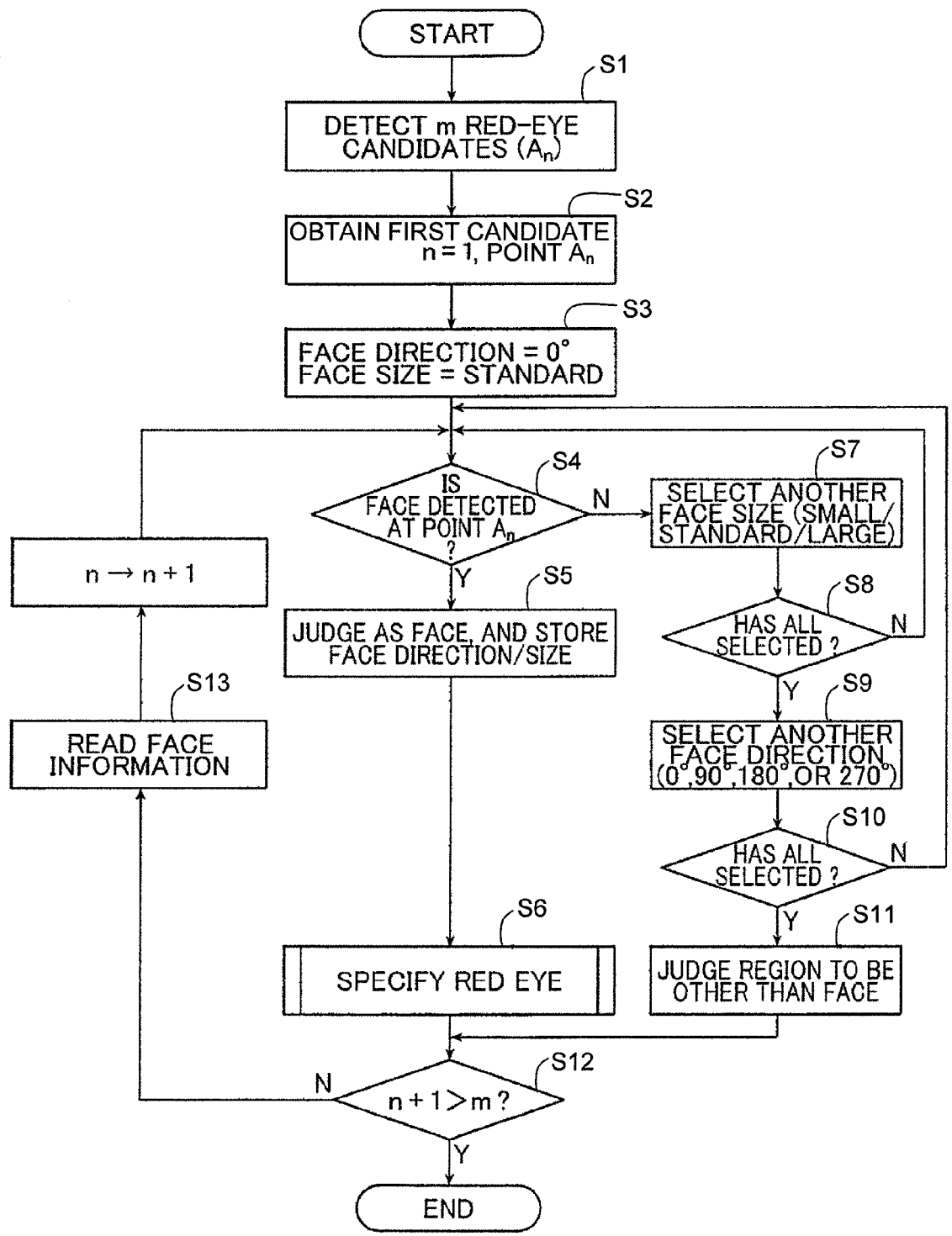
FIG. 4 is a flowchart of an example of red-eye detection according to the present invention.

Next, referring to a flowchart of FIG. 4, the red-eye detection of the present invention will be described more in detail.

Upon a start of red-eye detection, as described above, the red-eye candidate detection section 12 detects red-eye candidates from a target image in step S1.

Assuming that the detected red-eye candidates are m in total number, numbering of the red-eye candidates is executed. For a first obtained red-eye candidate (n=1, point $A_n$) in step S2, for example, the face detection section 14 tries face detection in a predetermined region including the point $A_n$ (n=1) based on a face direction of 0° and a standard size in step S3.

In step S4, a determination is made whether the face detection is successful at the point $A_n$ under these conditions. If true, the face detection section 14 stores information of the face detected at 0° and the standard size in the memory unit 18 in step S5. The red-eye specifying section 16 specifies this red-eye candidate as a red eye in step S6.

On the other hand, if the face detection fails at the point $A_n$ under the conditions, for example, the face detection section 14 subsequently changes the face size to try face detection at a large size in step S7. If the face detection succeeds under this condition, face information (face direction of 0° and large size) is similarly stored, and this red-eye candidate is specified as a red eye. On the other hand, if the face detection fails, the face size is changed again to try face detection at a small size. If the face detection succeeds, face information in this case is similarly stored, and this red-eye candidate is specified as a red eye.

In step S8, a determination is made whether the face detection operations fail at all the face sizes (end of all selection). If true, the face detection section 14 next changes the face direction to try face detection, for example, at 90° in step S9. It is to be noted that in this case the face size is a first standard size, and the "end of all selection" of face sizes is reset.

If a face is detected under these conditions, the face detection section 14 similarly stores face information (90° and standard size), and specifies this red-eye candidate as a red eye.

On the other hand, if the face detection fails under the conditions, the face size is changed again to try face detection at a large size as described above. If the face detection succeeds under this condition, the face information is similarly stored, and this red-eye candidate is specified as a red eye. If the face detection fails, the face size is changed to a small size to try face detection. If the face detection succeeds, face information in this case is similarly stored, and this red-eye candidate is specified as a red eye.

If face detection operations fail at all the face sizes when the face direction is 180°, the face direction is changed to 270°, and face detection operations at the point $A_n$ are sequentially tried from the standard size. If the face detection succeeds, face information is stored, and the red-eye candidate is specified as a red eye. In step S10, a determination is made whether face detection operations fail at all the face sizes at 270° (end of all selection), i.e., if face detection fails in the combination of all the face directions and sizes. If true, in step S11, a region around the point $A_n$ is judged to be a region other than a face.

If face detection operations fail at all the face sizes when the face direction is 180°, the face direction is changed to 270°, and face detection operations at the point $A_n$ are sequentially tried from the standard size. If the face detection succeeds, face information is stored, and the red-eye candidate is specified as a red eye. If the face detection operations fail at all the face sizes at 270° (end of all selection), i.e., if face detection fails in the combination of all the face directions and sizes, a region around the point $A_n$ is judged to be a region other than a face.

When the point $A_n$ is specified as a red eye (i.e., face is successfully detected), and when the region around the point $A_n$ is judged to be a region other than a face, n is next changed to n+1. In step S12, a determination is made whether n+1>m. In the case of n+1<m, the face detection is tried for a next point $A_n$ (red-eye candidate) for n=n+1.

Here, if there is face information stored in the memory unit 18, the face detection section 14 reads the face information, i.e., direction and size information of a last detected face, and first tries face detection corresponding to the read face information, in step S13. For example, if a face direction of 0° and a standard size have been stored as pieces of face information, face detection is first tried under these conditions. If a face direction of 0° and a large size have been stored as pieces of face information, face detection is first tried under these conditions.

If the face detection section 14 successfully detects a face under the conditions corresponding to the face information stored in the memory unit 18, the red-eye specifying section 16 similarly specifies the point $A_n$ as a red eye, and the face detection section 14 stores the face information again in the memory unit 18 (or information of the memory unit 18 is held as it is).

On the other hand, if a face cannot be detected under the conditions corresponding to the face information stored in the memory unit 18, as in the previous case, the face detection section 14 sequentially changes face sizes to try face detection, or sequentially changes face directions to try face detection. If this face detection is successful, the point $A_n$ is specified as a red eye, and information (face direction and size) of the detected face is stored. If the face detection fails even by using the combination of all the face directions and sizes, the point $A_n$ is judged not to be a red eye in the face region.

If the point $A_n$ is judged to be a red eye, or not to be a red eye in the face region, n at the point $A_n$ is changed to n+1. Similarly, thereafter, face detection operations are sequentially tried for subsequent red-eye candidates. At a point of time of n+1>m, i.e., when the trial of face detection is completed for all the red-eye candidates, the red-eye detection is finished.

It is to be noted that the present invention is not limited to storage of both of the face direction and the face size as face information as described above.

In the case of storing the face direction alone, for example, if first face detection fails, the face direction is fixed, and face sizes are sequentially changed in order determined by defaults to try face detection until it succeeds. If face detection fails at all the face sizes by using the stored face direction, the face direction is changed, and face detection operations are tried thereafter as in the previous case.

In the case of storing the face size alone, for example, if first face detection fails, the face size is fixed, and face directions are sequentially changed in order determined by defaults to try face detection unit it succeeds. If face detection fails in all the face directions by using the stored face size, the face size is changed, and face detection operations are tried thereafter as in the previous case.

The red-eye detection can be performed by executing a program on a computer.

That is, in the case of causing the computer to execute the process of detecting a particular region of a person from an image including a plurality of persons as objects, the program only needs to have the following procedures.

Specifically, the program includes: a procedure of causing a calculating unit of the computer to detect a region of an image satisfying detection conditions for red-eye candidates (particular region candidates) as a red-eye candidate (particular region candidate); a procedure of causing the calculating unit to detect a face region of a first person, and specify the detected red-eye candidate (particular region candidate) as a red eye (particular region) to be detected on condition that the red-eye candidate (particular region candidate) is included in the detected face region; a procedure of causing a memory of the computer to store the face direction and the face size (as pieces of face information) regarding the face of the first person obtained when the face region is detected; and a procedure of causing the calculating unit to detect, when a face region of a second person is further detected in the image by the calculating unit after the face direction and the face size (face information) are stored, the face region of the second person by using the face direction and the face size (face information) as face detection conditions.

Alternatively, a program causes the computer to execute a process of detecting a particular region of a person from a plurality of images including persons as objects, and the program preferably has the following procedures.

Specifically, the program includes: a procedure of causing a calculating unit of the computer to detect a region of an image satisfying detection conditions for red-eye candidates (particular region candidates) as a red-eye candidate (particular region candidate); a procedure of causing the calculating unit to detect a face region of a first person, and specify the detected red-eye candidate (particular region candidate) as a red eye (particular region) to be detected on condition that the red-eye candidate (particular region candidate) is included in the detected face region; a procedure of causing a memory of the computer to store the face direction and the face size (as pieces of face information) regarding the face of the first person obtained when the face region is detected; and a procedure of causing the calculating unit to detect, when a face region of a second person is further detected in other image by the calculating unit after the face direction and the face size (face information) are stored, the face region of the second person by using the face direction and the face size (face information) as face detection conditions.

The method and the apparatus for detecting particular regions, and the program of the present invention have been described in detail. However, the embodiments are in no way limitative of the present invention, and needless to say, various improvements and modifications can be made without departing from the gist of the present invention.

For example, the embodiment is the application of the detection method of the present invention to the red-eye detection. However, the present invention is not limited to this, and various objects likely to be present in a face region of an image such as eyes, eye corners, eyebrows, a mouth, a nose, glasses, pimples, moles, and wrinkles may be set as particular regions. For example, pimple candidates may be detected from the image, face detection may be performed in a region around the pimple candidates, and pimple candidates around which a face is detected may be specified as pimples.

As a detection method of the particular region candidates in this case, for example, a well-known method may be employed such as a method of detecting a region having a color or a shape intrinsic to a detection target particular region from an image or a method of performing matching by using a template created by learning from many image samples of detection target particular regions.

What is claimed is:

1. A particular-region detection method of detecting particular regions of persons from an image including a plurality of persons as objects by using a computer including calculating means and memory means, comprising:
   detecting a plurality of regions of the image satisfying detection conditions for particular region candidates as a particular region candidate by the calculating means of the computer;
   detecting a face region of a first person having a face in one of the plurality of regions including one of the particular region candidates and specifying the particular region candidate as a particular region to be detected on condition that the particular region candidate is included in the detected face region, by the calculating means of the computer;
   storing, by the memory means of the computer, face information regarding the face of the first person obtained when the face region is detected; and
   accessing the face information when a face region of a second person having a face different from the face of the first person is further detected in another region of the image including another particular region candidate after said storing of the face information, and detecting the face region of the second person by using the face information as a face detection condition, by the calculating means of the computer, wherein the first person face information comprises orientation information and face size information and the method further comprises:
   storing a plurality of predetermined face size values in a first sequence of a predetermined order;
   storing a plurality of predetermined face orientation values in a second sequence of a predetermined order;
   (a) determining the region which surrounds an exterior of the particular region candidate of the second person as lacking the face region, based on the face size and orientation information of the first person;
   (b) selecting a predetermined face size value from the first sequence;
   (c) determining whether the region which surrounds the exterior of the particular region candidate of the second person is the face region; and
   (d) based on step (c), one of:
      sequentially selecting predetermined face size values from the first sequence and repeating step (c) until all of the stored predetermined face size values are used, and
      detecting the second person face and storing face information of the second person.

2. The particular-region detection method according to claim 1, wherein the particular region comprises a red-eye region.

3. The method according to claim 1, wherein the orientation information defines a rotation angle of the face of the first person with respect to X and Y axes of Cartesian coordinate system.

4. The method according to claim 1, further comprising:
   (e) selecting a predetermined orientation value from the second sequence, if all of the stored predetermined face size values are used and no second person face is detected;
   (f) determining whether the region which surrounds the exterior of the particular region candidate of the second person is the face region; and
   (g) based on step (f), one of:
      sequentially selecting predetermined orientation values from the second sequence and repeating step (f) until all of the stored predetermined orientation values are used, and
      detecting the second person face and storing face information of the second person.

5. The method according to claim 4, further comprising:
   determining that the particular region candidate of the second person lacks the particular region if no second person face region is detected in the region which surrounds the exterior of the particular region candidate of the second person.

6. A particular-region detection method of detecting particular regions of persons from a plurality of images including the persons as objects by using a computer including calculating means and memory means, comprising:
   detecting a region of an image satisfying detection conditions for particular region candidates as a particular region candidate in each of the plurality of images by the calculating means of the computer;

detecting a face region of a first person having a face in a region including a particular region candidate in one of the plurality of images and specifying the particular region candidate as a particular region to be detected on condition that the particular region candidate is included in the detected face region, by the calculating means of the computer;

storing, by the memory means of the computer, face information regarding the face of the first person obtained when the face region is detected; and accessing the face information when a face region of a second person having a face different from the face of the first person is further detected in another region of another image including another particular region candidate after said storing of the face information, and detecting the face region of the second person by using the face information as a face detection condition, by the calculating means of the computer, wherein the first person face information comprises orientation information and face size information and the method further comprises:

storing a plurality of predetermined face size values in a first sequence of a predetermined order;

storing a plurality of predetermined face orientation values in a second sequence of a predetermined order;

(a) determining the region which surrounds an exterior of the particular region candidate of the second person as lacking the face region, based on the face size and orientation information of the first person;

(b) selecting a predetermined face size value from the first sequence;

(c) determining whether the region which surrounds the exterior of the particular region candidate of the second person is the face region; and (d) based on step (c), one of:

sequentially selecting predetermined face size values from the first sequence and repeating step (c) until all of the stored predetermined face size values are used, and detecting the second person face and storing face information of the second person.

7. The particular-region detection method according to claim 6, wherein the particular region comprises a red-eye region.

8. A particular-region detection apparatus for detecting a particular regions of persons from an image including a plurality of persons as an object, comprising:

detection means for detecting a plurality of regions of the image satisfying detection conditions for particular region candidates as a particular region candidate;

specifying means for detecting a face region of a first person having a face in one of the plurality of regions including one of the particular region candidates and specifying the particular region candidate as a particular region to be detected on condition that the particular region candidate is included in the detected face region; and memory means for storing face information regarding the face of the first person which is obtained by previous detection and specification by said specifying means, wherein said specifying means detects the face region of a second person, having a face different from the face of the first person, in another region of the image including another particular region candidate by retrieving the face information stored in the memory means and by using the face information as a face detection condition, wherein the first person face information comprises orientation information and face size information, the memory means stores a plurality of predetermined face size values in a first sequence of a predetermined order, the memory means stores a plurality of predetermined face orientation values in a second sequence of a predetermined order, and the specifying means further executes procedures of:

(a) determining the region which surrounds an exterior of the particular region candidate of the second person as lacking the face region, based on the face size and orientation information of the first person;

(b) selecting a predetermined face size value from the first sequence;

(c) determining whether the region which surrounds the exterior of the particular region candidate of the second person is the face region; and (d) based on procedure (c), one of:

sequentially selecting predetermined face size values from the first sequence and repeating procedure (c) until all of the stored predetermined face size values are used, and detecting the second person face and causing the memory means to store face information of the second person.

9. The particular-region detection apparatus according to claim 8, wherein the particular region comprises a red-eye region.

10. A computer-readable non-transitory medium storing a computer program, which, when executed by a computer, causes the computer to execute processing of detecting particular regions of persons from an image including a plurality of persons as objects, the program comprising the procedures of:

causing calculating means of the computer to detect a plurality of regions of the image satisfying detection conditions for particular region candidates as a particular region candidate;

causing the calculating means to detect a face region of a first person having a face in one of the plurality of regions including one of the particular region candidates, and specify the particular region candidate as a particular region to be detected on condition that the particular region candidate is included in the detected face region;

causing memory means of the computer to store face information regarding the face of the first person obtained when the face region is detected; and causing the calculating means to detect, when a face region of a second person having a face different from the face of the first person is further detected in another region of the image including another particular region candidate by the calculating means after the face information is stored, the face region of the second person by using the face information as a face detection condition, wherein the first person face information comprises orientation information and face size information and the program further comprises the procedures of:

causing the memory means to store a plurality of predetermined face size values in a first sequence of a predetermined order;

causing the memory means to store a plurality of predetermined face orientation values in a second sequence of a predetermined order;

(a) causing the calculating means to determine the region which surrounds an exterior of the particular region candidate of the second person as lacking the face region, based on the face size and orientation information of the first person, (b) causing the calculating means to select a predetermined face size value from the first sequence;

(c) causing the calculating means to determine whether the region which surrounds the exterior of the particular region candidate of the second person is the face region; and (d) based on procedure (c), one of:
causing the calculating means to sequentially select predetermined face size values from the first sequence and repeating procedure (c) until all of the stored predetermined face size values are used, and
causing the calculating means to detect the second person face and causing the memory means to store face information of the second person.

11. The medium according to claim 10, wherein the particular region comprises a red-eye region.

12. A computer-readable non-transitory medium storing a computer program, which, when executed by a computer, causes the computer to execute processing of detecting particular regions of persons from a plurality of images including the persons as objects, the program comprising the procedures of:

causing calculating means of the computer to detect a region of an image satisfying detection conditions for particular region candidates as a particular region candidate in each of the plurality of images;

causing the calculating means to detect a face region of a first person having a face in a region including a particular region candidate in one of the plurality of images, and specify the particular region candidate as a particular region to be detected on condition that the particular region candidate is included in the detected face region;

causing memory means of the computer to store face information regarding the face of the first person obtained when the face region is detected; and causing the calculating means to detect, when a face region of a second person having a face different from the face of the first person is further detected in another region of another image including another particular region candidate by the calculating means after the face information is stored, the face region by using the face information as a face detection condition, wherein the first person face information comprises orientation information and face size information and the program further comprises the procedures of:

causing the memory means to store a plurality of predetermined face size values in a first sequence of a predetermined order;

causing the memory means to store a plurality of predetermined face orientation values in a second sequence of a predetermined order;

(a) causing the calculating means to determine the region which surrounds an exterior of the particular region candidate of the second person as lacking the face region, based on the face size and orientation information of the first person;

(b) causing the calculating means to select a predetermined face size value from the first sequence;

(c) causing the calculating means to determine whether the region which surrounds the exterior of the particular region candidate of the second person is the face region; and (d) based on procedure (c), one of:
causing the calculating means to sequentially select predetermined face size values from the first sequence and repeating procedure (c) until all of the stored predetermined face size values are used, and
causing the calculating means to detect the second person face and causing the memory means to store face information of the second person.

13. The medium according to claim 12, wherein the particular region comprises a red-eye region.

14. A particular-region detection apparatus for detecting particular regions of persons from a plurality of images including the persons as objects, comprising:

detection means for detecting a region of an image satisfying detection conditions for particular region candidates as a particular region candidate in each of the plurality of images;

specifying means for detecting a face region of a first person having a face in a region including a particular region candidate in one of the plurality of images and specifying the particular region candidate as a particular region to be detected on condition that the particular region candidate is included in the detected face region; and memory means for storing face information regarding the face of the first person which is obtained by previous detection and specification by said specifying means, wherein said specifying means detects the face region of a second person, having a face different from the face of the first person, in another region of another image including another particular region candidate by retrieving the face information stored in the memory means and by using the face information as a face detection condition, wherein the first person face information comprises orientation information and face size information, the memory means stores a plurality of predetermined face size values in a first sequence of a predetermined order, the memory means stores a plurality of predetermined face orientation values in a second sequence of a predetermined order, and the specifying means further executes procedures of:

(a) determining the region which surrounds an exterior of the particular region candidate of the second person as lacking the face region, based on the face size and orientation information of the first person;

(b) selecting a predetermined face size value from the first sequence;

(c) determining whether the region which surrounds the exterior of the particular region candidate of the second person is the face region; and (d) based on procedure (c), one of:
sequentially selecting predetermined face size values from the first sequence and repeating procedure (c) until all of the stored predetermined face size values are used, and
detecting the second person face and causing the memory means to store face information of the second person.

15. The particular-region detection apparatus according to claim 14, wherein the particular region comprises a red-eye region.

* * * * *